M. H. FISHER.
SPROCKET CHAIN.
APPLICATION FILED MAY 25, 1914.

1,266,572.

Patented May 21, 1918.

Witnesses
Martin H. Olsen
Robert Dobberman

Inventor
Milan H. Fisher
By Rector Hibben Davis & Macaulay
His Att'ys

UNITED STATES PATENT OFFICE.

MILAN H. FISHER, OF CHICAGO, ILLINOIS, ASSIGNOR TO DONALDSON & FISHER COMPANY, OF CHICAGO, ILLINOIS, A CORPORATION OF ARIZONA.

SPROCKET-CHAIN.

1,266,572.  Specification of Letters Patent.  Patented May 21, 1918.

Application filed May 25, 1914. Serial No. 840,663.

*To all whom it may concern:*

Be it known that I, MILAN H. FISHER, a citizen of the United States, residing at Chicago, in the county of Cook and State of Illinois, have invented certain new and useful Improvements in Sprocket-Chains, of which the following is a specification.

Sprocket chains of the character to which my invention relates consist of a series of block or middle links, the successive blocks being connected together by pairs of side or cheek links, the ends of which are pivoted to the adjacent ends of the block link. When such a chain is used in connection with a sprocket wheel the intermediate or block links engage and lie upon the portions of the periphery of the sprocket wheels intermediate the teeth thereof while the side links embrace the opposite sides of the teeth of the sprocket, which teeth also extend between and engage the ends of the successive block links. In these sprocket chains as at present constructed, the block links as they approach the portions of the periphery of the sprocket wheel which they are about to engage, may assume any angular position with respect thereto, particularly if the chain is rather loose upon the sprockets, or if for any reason the chain is subject to jarring or sidewise strain, or the action of the chain has become stiffened. And even after a block link has seated itself upon the periphery of the sprocket with which it engages, it may assume an angular position with respect thereto unless the chain is drawn sufficiently taut to straighten out the link. Furthermore while the chain is traveling between the sprockets the same irregularity of action upon the part of the block links may take place. It is the object of my invention to provide means for causing the block links to assume at all times positions in which their longitudinal axes are substantially parallel or tangent to the general direction of the chain at the point at which the link occurs.

Figure 1:
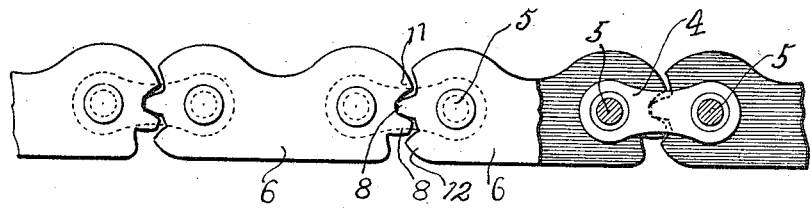
Figure 2:
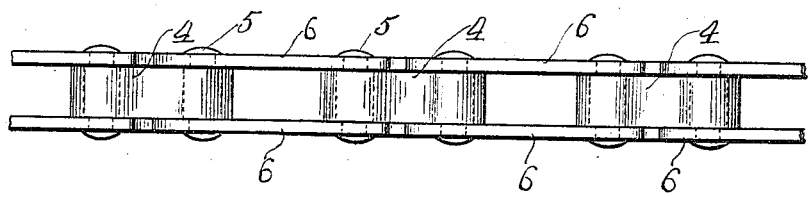

A preferred form of my invention will be described in connection with the accompanying drawing in which Figure 1 is a side elevation of a section of chain embodying my invention, a portion thereof however being cut away on a plane parallel to that of the figure to better show the internal construction; Fig. 2 is a plan view of the same at right angles to Fig. 1; and Fig. 3 a view showing the chain applied to a sprocket, the latter being shown in dotted lines.

Figure 3:
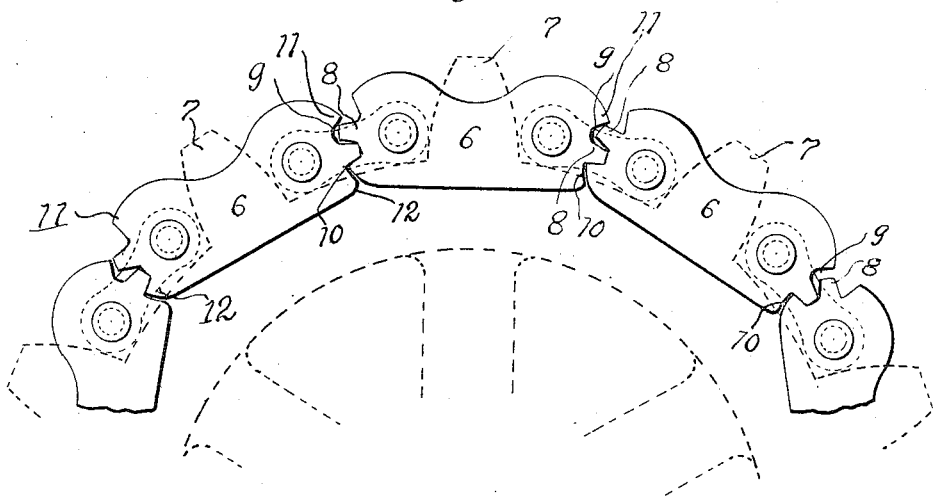

The chain is as usual composed of a series of block or central links 4 which are rounded at their ends and transversely bored for the reception of the pivot pins 5. The pivot pins are reduced at their ends where they extend through side links 6 and are upset upon the outer faces of the side links to secure and hold the latter in position. A pair of these side links connects the adjacent ends of each successive pair of block links and when the chain is in position on a sprocket wheel, as shown in Fig. 3, the teeth 7 of the latter extend between the successive block links and are embraced laterally by the side links, the block links seating themselves in the recesses between the succeeding teeth. As thus far described the chain shown in the drawings is not essentially different from other sprocket chains. In order, however, to overcome the objection to the action of sprocket chains referred to above, I form upon the ends of the side links mutually engaging gear teeth 8. The number of the gear teeth may vary and the arc over which they extend in the case of each link may also be varied according to the purpose for which the chain is to be used and the sharpness of the curves or diameters of the sprocket wheels which the chain is to follow. In the present instance I have shown a single full tooth on each end of each link with a recess 9, 10 upon each side thereof, but as above stated the number of teeth may be increased. Also it is to be observed that in the form of chain chosen to illustrate my invention, the walls or outside shoulders 11, 12 of the recesses are so formed as to constitute stops to limit the angular movement of the side links about their pivots. For some purposes this is a desirable feature, but if desired the metal may be so cut away that the extent of angular movement of the links in respect to each other in either direction is unlimited. In the accompanying drawings I have shown all the side links as formed with intermeshing ends but obviously the same result could be accomplished though not quite so perfectly by thus forming the links upon one side of the chain only, and rounding the ends of the links upon the other side as in ordinary sprocket chains.

It will now be seen that by reason of the engagement of the ends of adjacent side links with each other the angles which they form with the intermediate block link necessarily equal the same angle, so that the longitudinal axis of said block link is parallel at all times to a line connecting the pivots of the remote ends of such side links, or in other words, the block link is maintained substantially parallel to the line of the chain at the point where said link is found or tangent to the curve thereof in case the chain is bent as upon the periphery of a sprocket wheel. By reason of this construction the block links are presented to the seats between the teeth of the sprocket wheel in a position to properly engage the same and buckling and irregular action of the sprocket chain is prevented.

I claim:

1. A sprocket chain composed of block links and side links, the adjacent ends of the latter being so formed as to engage each other throughout the normal movement of the parts.

2. In a sprocket chain and in combination with the block links thereof, side links connecting the block links having intermeshing teeth formed upon the ends thereof, the teeth upon adjacent ends of adjoining side links intermeshing to maintain said links at equal angles to the intermediate block links.

3. In a sprocket chain and in combination with the block links thereof, side links connecting the block links, adjacent ends of the side links having intermeshing projections whereby the angles formed by adjacent side links with the intermediate block links are maintained equal.

4. In a sprocket chain and in combination with the block links thereof, pairs of side links connecting said block links and having angular motion only with reference thereto, adjacent ends of successive links having a tooth and a pair of shoulders respectively, said tooth projecting between and engaging said shoulders to maintain the respective links at the same angle with the intermediate block links.

MILAN H. FISHER.

Witnesses:
JOHN B. MACAULEY,
ROBERT DOBBERMAN.

Copies of this patent may be obtained for five cents each, by addressing the "Commissioner of Patents, Washington, D. C."